United States Patent [19]

Boumarafi et al.

[11] Patent Number: 5,230,534
[45] Date of Patent: Jul. 27, 1993

[54] ADJUSTABLE SEAT BELT TURNING LOOP ANCHORAGE WITH RELEASE BUTTON

[75] Inventors: Mohamed Boumarafi, Rochester Hills; Carl Pondell, Sterling Hgts., both of Mich.

[73] Assignee: Allied-Signal Inc., Morristown, N.J.

[21] Appl. No.: 876,937

[22] Filed: Apr. 30, 1992

[51] Int. Cl.5 .............................................. B60R 22/20
[52] U.S. Cl. .................................. 290/801 A; 297/483
[58] Field of Search ........................... 280/801, 801 A; 297/468, 483

[56] References Cited

U.S. PATENT DOCUMENTS

| | | | |
|---|---|---|---|
| 4,552,408 | 11/1985 | Ono | 280/801 A X |
| 4,569,537 | 2/1986 | Else | 280/801 A |
| 4,711,498 | 12/1987 | Adomeit | 280/801 A X |
| 5,044,666 | 9/1991 | Griesemer | 280/801 A |
| 5,050,907 | 9/1991 | Boumarafi et al. | 280/801 A |

FOREIGN PATENT DOCUMENTS

| | | | |
|---|---|---|---|
| 0150065 | 7/1985 | European Pat. Off. | 280/801 A |
| 0186961 | 7/1986 | European Pat. Off. | 280/801 A |
| 3630265 | 3/1987 | Fed. Rep. of Germany | 280/801 A |
| 2241635 | 9/1991 | United Kingdom | 280/801 A |

*Primary Examiner*—Brian Johnson
*Attorney, Agent, or Firm*—Markell Seitzman

[57] ABSTRACT

A height adjusting mechanism for a safety belt comprising a track adapted to the secured in a general vertical orientation to a portion of the vehicle. The track includes a central channel and a carrier slidably received thereon. The carrier includes structure to support a D-ring. The height adjusting mechanism further includes a latch plate tiltably located within the track and movable with the carrier.

6 Claims, 3 Drawing Sheets

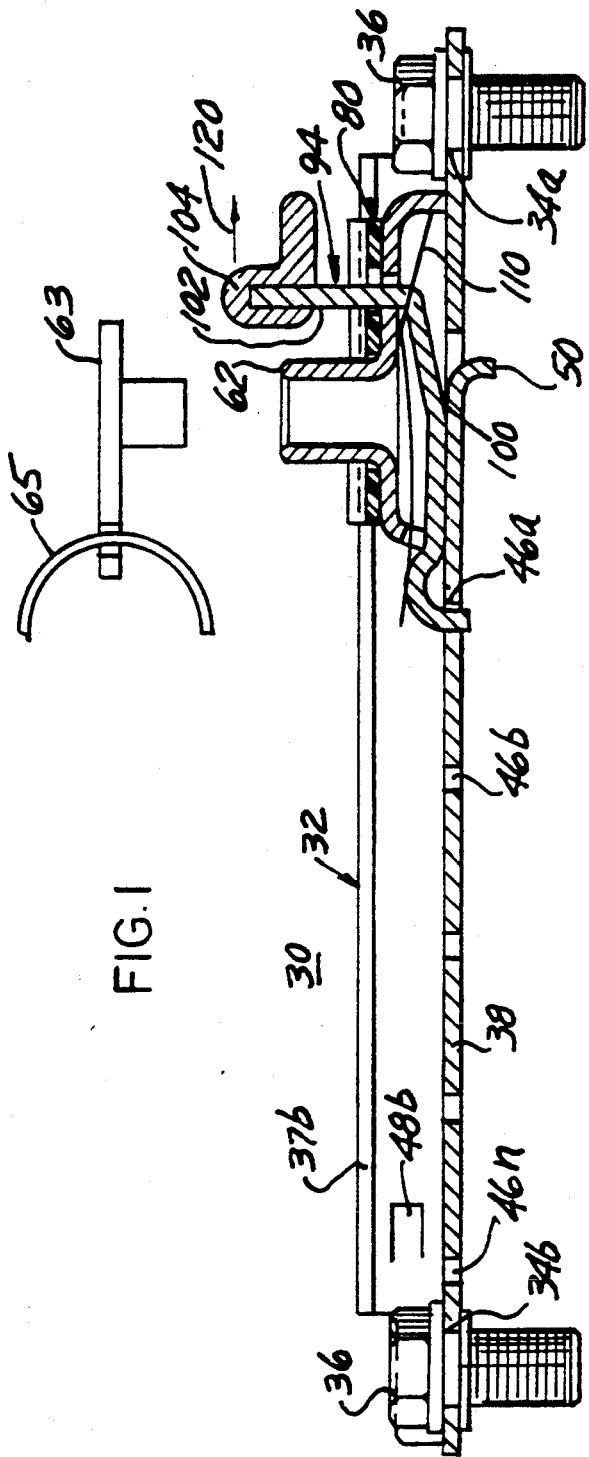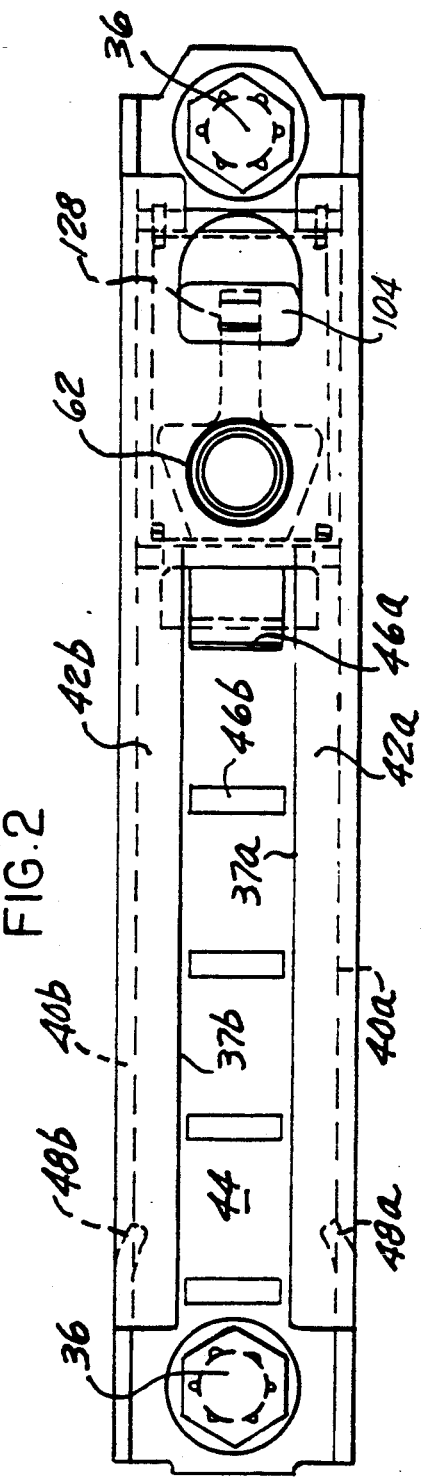
FIG. 1
FIG. 2

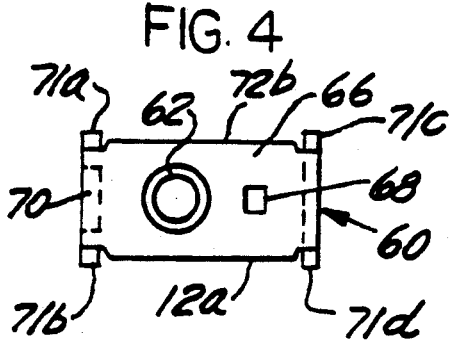
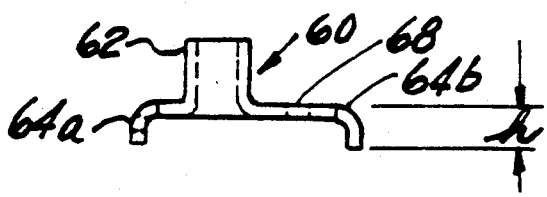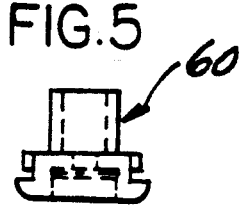
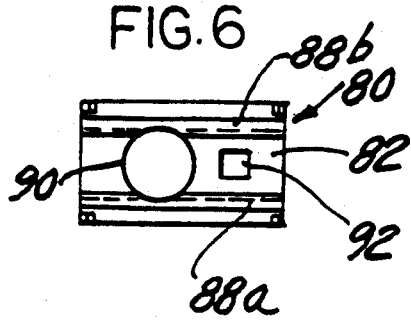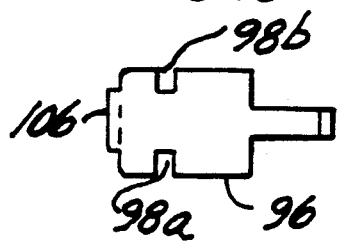
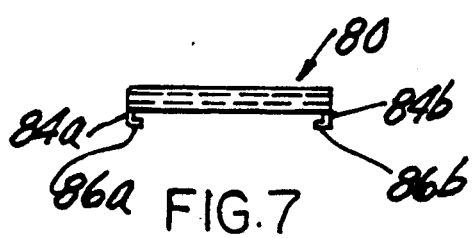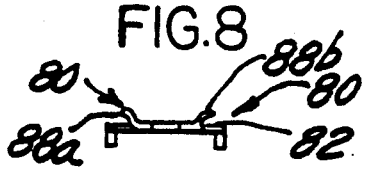
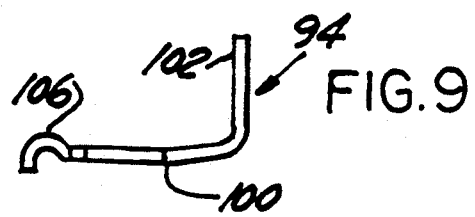

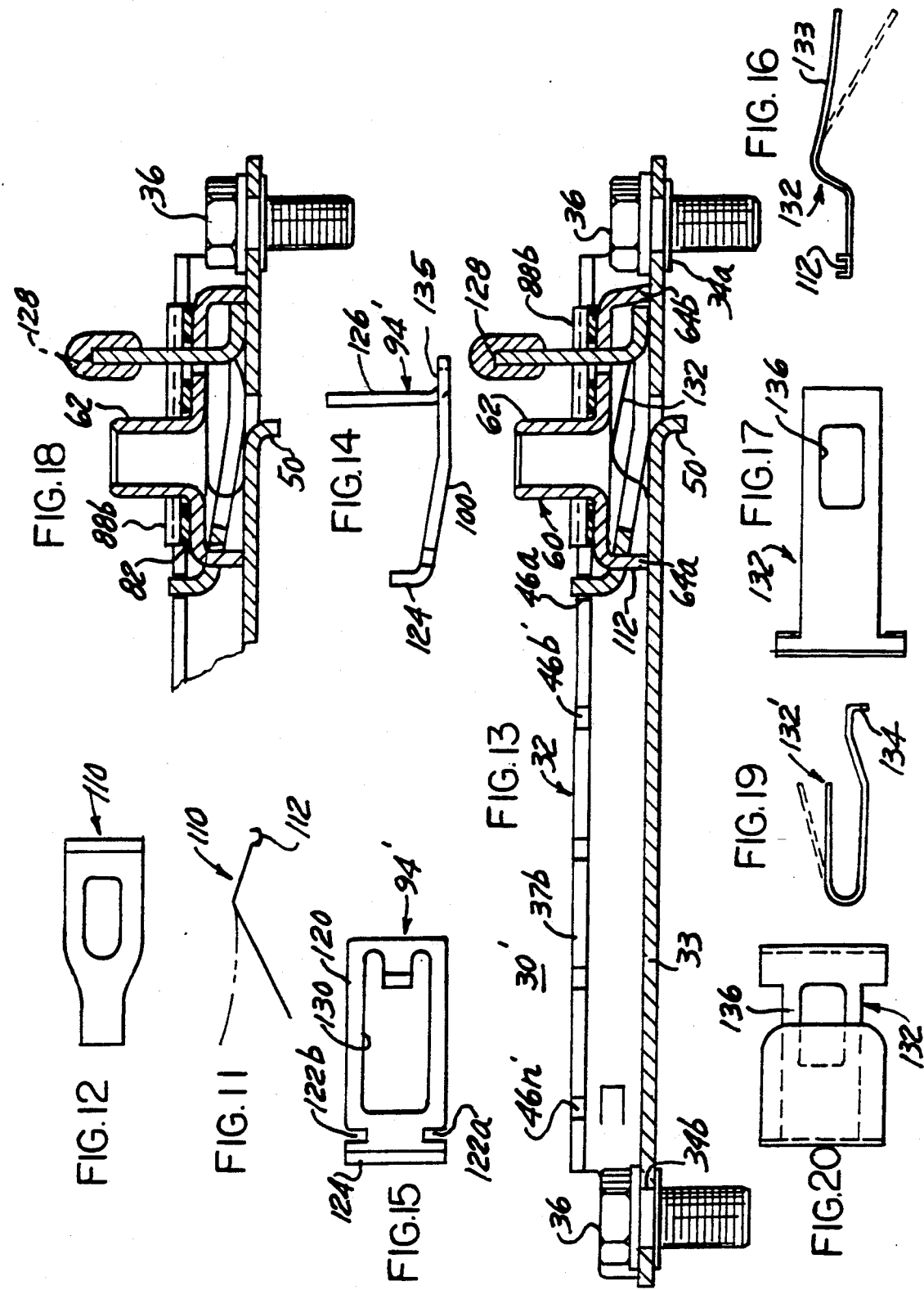

ADJUSTABLE SEAT BELT TURNING LOOP ANCHORAGE WITH RELEASE BUTTON

BACKGROUND AND SUMMARY OF THE INVENTION

The present invention relates to a height adjusting mechanism for a safety belt and more particularly to a mechanism useful in changing the vertical position of a shoulder belt and its turning loop or D-ring.

The invention comprises a height adjusting mechanism for a safety belt comprising a track, adapted to be secured in a generally vertical orientation to a portion of a vehicle, the track including a central channel formed therein, and a plurality of slots or grooves, vertically positioned along the track. The mechanism comprises a carrier slidably received in the track, including engagement means extending through the central channel for supporting a D-ring through which the safety belt extends. The mechanism additionally includes a latch plate tiltably located within the track and movable with the carrier. The latch plate comprises a first portion forming a fulcrum, a second portion extending from the first portion, having formed at one end thereof first means (106, 124) for lockingly engaging a designated groove; and a third portion located on an opposite side of the fulcrum away from the second portion. The third portion includes a bar extending outwardly through the central channel of the track, such that when force is exerted on the bar the latch plate pivots about the fulcrum causing the first means to disengage from a selected slot or groove (46) such that the latch plate can be slid vertically in the track carrying therewith the carrier, and repositioned to enable the second portion to engage another slot or groove. In one embodiment of the invention the track includes slots in a front portion and in another embodiment slots are in a rear or bottom portion.

Many other objects and purposes of the invention will be clear from the following detailed description of the drawings.

BRIEF DESCRIPTION OF THE DRAWINGS

In the drawings:

FIGS. 1 and 2 illustrate a side cross-sectional view and a top plan view respectively of a first embodiment of the invention.

FIGS. 3-5 illustrate various views of a carrier.

FIGS. 6-8 illustrate various views of a low friction member.

FIGS. 9 and 10 illustrate two views of a latch plate.

FIGS. 11 and 12 illustrate two views of a spring.

FIG. 13 illustrates a cross-sectional view of an alternate embodiment of the present invention.

FIGS. 14 and 15 illustrate views of an alternate latch plate.

FIGS. 16 and 17 illustrate various views of the bias spring.

FIG. 18 illustrates an alternate embodiment of the present invention.

FIGS. 19 and 20 illustrate an alternate spring configuration.

DETAILED DESCRIPTION OF THE DRAWINGS

FIGS. 1 and 2 illustrate a height adjusting mechanism 30 for a safety belt. The height adjusting mechanism comprises a track generally shown as 32 having openings 34a and 34b at opposite ends thereof for receipt of a fastener 36 such as a bolt for attaching the track to the B pillar of an automobile. In use, the track 32 is positioned vertically. The track 32 includes a back portion 38, sides 40a and 40b integrally extending from the back portion, and two opposing front members 42a and 42b. The spacing between the front members defines a central channel generally shown as 44. The back portion 38 includes grooves or slots 46a, 46b . . . 46n. The lower portions of sides 40a and b include a tab 48a and 48b which integrally extends from the respective side, to provide a stop for a carrier 60. The bottom 38 also includes a tab 50, which may be inserted in a hole in the B pillar to position the track 32 prior to insertion of the bolts 36.

The carrier 60 is slidably received within the track 32. The carrier 60 includes an internally threaded boss 62 extending outwardly from the front members. A turning loop or D-ring 63 is attached to the boss 62 and the shoulder belt 65 extends therethrough in a known manner. The carrier 60 is shown in greater detail in FIGS. 3-5. As can be seen, the carrier is generally rectangular shaped and includes bent over end portions 64a and 64b, the bottoms of which slide on the bottom 38 of the track 32. The central flat portion 66 of the carrier 60 includes a small opening 68 and the bent over portion 64a includes a partial opening 70 (slot, notch etc). The ends 71a,b and 71c,d of each bent over end portion 64a extends outwardly from the central plate 66. The distance between each respective end 71a-71b, and 71c-71d is approximately the same as the spacing between the sides 40a and 40b of the track. As can be appreciated, the ends 70a-70d laterally stabilize the carrier with the track 32. As can be seen from FIG. 1 and also FIG. 3, the height h of the end portion 64a and 64b is slightly smaller than the height of the track. In order to stabilize the carrier within the track and also to reduce the sliding friction against the underside of the front members 42a and 42b, an additional member 80 is fitted to the top of the carrier 60. This member 80 is illustrated in greater detail in FIGS. 6-8. The member 80 is fabricated of a flexible plastic and includes a central plate 82 and a plurality of sides 84a,b extending downwardly therefrom. Each of the sides includes an inwardly directed tab, such as 86a and 86b. Extending upwardly from the plate 82 are a plurality of tabs 88a and 88b. The plate 82 includes a large opening 90 and a smaller opening 92. The member 80 is placed over the carrier such that the tabs 86a and b grab respective sides 72a and 72b of the carrier. The opening 90 is fitted about the boss 62 and the opening 92 is positioned over the opening 68 within the carrier 60. Also, the tabs 88a and 88b fit over a respective one of the end faces 37a and 37b of the front portions 42a and 42b of the track 32 and slide thereon.

Fitted within the carrier 60 is a latch plate 94. The latch plate 94 is more clearly illustrated in FIGS. 9 and 10. The latch plate is fabricated of steel and includes a central plate portion 96 having opposing slots 98a and 98b formed therein. The right hand portion of the plate 96 is bent upwardly at 100 to provide a pivot point. A narrow handle 102 extends outwardly from the plate 96 and a button 104 (see FIG. 1) may be fitted to the end of the handle 102. The opposite end of the plate 96 is formed with a hook 106 which is adapted to be received within a selected one of the slots 46. When the latch plate 94 is positioned within the carrier 60, the ends 71a and 71b thereof are fitted within the slots 98a and 98b and the hook extends outwardly through the opening or notch 70. In addition, the handle extends upwardly through the opening 68 within the carrier and opening 92 within the low friction member 80. A bias spring 110 is used to maintain the hook 106 in the selected slot 46. The spring 110 is shown in greater detail in FIGS. 11 and 12. As can be seen, one end of the spring is formed with a groove 112 that is adapted to be received about the end of the downwardly curved member 64b of the carrier 60. FIG. 11 illustrates in solid line the free or unstressed position of the spring 110 and in dashed line the installed position which can also be seen in FIG. 1.

The height adjusting mechanism 30, illustrated in the above described drawings, operates in the following manner. When the vehicle user desires to reposition the carrier 60 within the track 32, an inward force is exerted on button 104. This force causes the latch plate 94 to rotate clockwise as illustrated in FIG. 1 about the pivot 100 thereby moving the hook 106 out of selected the slot 46a-n. With the hook 106 now out of the slot 46a-n, the vehicle user slides the button 104 and carrier 60 upwardly (see arrow 120, FIG. 1) or downwardly within the track to another slot 46a-n.

Reference is now made to FIGS. 13-15 which illustrate an alternate embodiment of the present invention. As can be seen in FIG. 13, one difference between the track 30 utilized in FIG. 1 and the track 30' shown in FIG. 13 is that the slots 46 in the bottom 38 have been removed and replaced with opposing sets of grooves or slots 46a'-46n' formed in each front member 42a and 42b. This change in the track necessitates a change in the design of the latch plate. FIGS. 14 and 15 illustrate an alternate latch plate 94'. The latch plate 94' comprises a central plate 120 which is bent at location 100 to provide a pivot point or fulcrum. The plate 120 includes opposing grooves 122a and 122b. An end of the plate is formed with a hook 124 which engages a corresponding set of the grooves 46a'-n' formed in the track 30. Extending from an opposite portion of the plate 120 is a handle 126 that may be provided with a knob 128 (see FIG. 13). The central portion of the plate 120 includes an opening 130. The latch plate is biased against the carrier to maintain the hook 124 within the selected slot 46a'-n'. As before, the ends 71a and 71b of the carrier are inserted within grooves of the latch plate such as grooves 122a and 122b. The hook 124 extends through the opening 70 formed in the carrier 60. FIGS. 16 and 17 illustrate various views of a bias spring 132. Spring 132 includes a groove 112 which fits upon bent end 64a of the carrier. The end 133 of the spring 132 biases the latch plate 94' in a clockwise manner as viewed in FIG. 13. The spring 132 further includes a central opening 136 which permits the spring to be fitted about the handle 126.

FIGS. 18-20 illustrate an alternate embodiment of the invention which is virtually identical to the embodiment of the invention illustrated in FIG. 13. The only difference is in the construction of the spring 132. As illustrated in FIGS. 19 and 20, the spring 132' comprises a bent over configuration comprising a hook 134 at one end thereof which engages the end 135 of the latch plate (see FIG. 14). The spring 132' also includes a central opening 136. The stressed and free positions of the spring is also shown in FIG. 19 in dotted line.

Many changes and modifications in the above described embodiment of the invention can, of course, be carried out without departing from the scope thereof. Accordingly, that scope is intended to be limited only by the scope of the appended claims.

We claim:

1. A height adjusting mechanism for a safety belt comprising:
    a track including a central channel formed therein, and a plurality of slots or grooves, vertically positioned along the track;
    a carrier slidably received in the track including engagement means extending through the central channel for supporting a D-ring through which the safety belt extends;
    a latch plate tiltably located within the track and movably connected with the carrier comprising
    a first portion forming a fulcrum,
    a second portion extending from the first portion on a first side of the fulcrum, having formed at one end thereof first means for lockingly engaging a designated slot or groove;
    a third portion located on an opposite side of the fulcrum away from the second portion including a bar extending outwardly through the central channel of the track, such that when force is exerted on the bar the latch plate pivots about the fulcrum causing the first means to disengage from a designated slot or groove such that the latch plate can be slid vertically in the track carrying therewith the carrier, and repositioned to enable the first means to engage another slot or groove, wherein the carrier comprises an opening therein through which the bar extends, a central plate having first and second end portions, each first and second end portion arcuately extending from the central portion and including a respective engagement surface slidable relative to a back portion of the track, each first and second end portion including oppositely extending first and second members each such first and second member spaced slightly away from a corresponding interior side wall of the track, one of the end portions including a notch through which extends the second portion of the latch plate, the second portion being movable in the notch as the latch plate is tilted.

2. The mechanism as defined in claim 1, further including spring means for biasing the latch plate into the designated slot or groove.

3. The mechanism as defined in claim 1 including a member having a low coefficient of friction, the member carried by the carrier and slidingly engagable with front portions of the track, such front portions being spaced from each other defining the central channel.

4. A height adjusting mechanism for a safety belt comprising:
    a track including a central channel formed therein, and a plurality of slots or grooves, vertically positioned along the track,
    a carrier slidably received in the track, including engagement means extending through the central channel for supporting a D-ring through which the safety belt extends;
    a latch plate tiltably located within the track and movably connected with the carrier comprising:
    manually movable first means for lockingly engaging a designated slot or groove;
    a member having a low coefficient of friction carried by the carrier and slidingly engagable with front portions of the track, such front portions being spaced from each other defining the central channel the member including oppositely positioned tabs which envelop respective opposing end faces of the front portions of the track.

5. The mechanism as defined in claim 4 wherein the slots or grooves are formed in the front portions of the track.

6. The mechanism as defined in claim 4, further including spring means for biasing the latch plate into the designated slot or groove.

* * * * *